US010320833B2

(12) United States Patent
Israel et al.

(10) Patent No.: US 10,320,833 B2
(45) Date of Patent: Jun. 11, 2019

(54) SYSTEM AND METHOD FOR DETECTING CREATION OF MALICIOUS NEW USER ACCOUNTS BY AN ATTACKER

(71) Applicant: Microsoft Technology Licensing, LLC, Redmond, WA (US)

(72) Inventors: Moshe Israel, Herzliya (IL); Nir Gafni, Herzliya (IL); Josef Weizman, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 15/488,154

(22) Filed: Apr. 14, 2017

(65) Prior Publication Data

US 2018/0302430 A1 Oct. 18, 2018

(51) Int. Cl.
| | |
|---|---|
| G06F 21/00 | (2013.01) |
| H04L 29/06 | (2006.01) |
| G06F 21/60 | (2013.01) |
| G06Q 50/00 | (2012.01) |

(52) U.S. Cl.
CPC ........ *H04L 63/1441* (2013.01); *G06F 21/604* (2013.01); *G06Q 50/01* (2013.01); *H04L 63/105* (2013.01); *G06F 2221/2117* (2013.01); *H04L 2463/121* (2013.01)

(58) Field of Classification Search
CPC ............... H04L 63/1441; H04L 63/105; H04L 2463/121; G06Q 50/01; G06F 21/604; G06F 2221/2117
See application file for complete search history.

(56) References Cited

U.S. PATENT DOCUMENTS

| | | | |
|---|---|---|---|
| 7,007,174 B2 * | 2/2006 | Wheeler | G06F 17/30867 707/E17.109 |
| 8,285,658 B1 * | 10/2012 | Kellas-Dicks | G06F 21/316 706/20 |
| 8,862,524 B2 | 10/2014 | Zheng et al. | |
| 9,148,434 B2 | 9/2015 | Yu et al. | |
| 9,189,746 B2 | 11/2015 | Zhu et al. | |

(Continued)

OTHER PUBLICATIONS

"International Search Report and Written Opinion Issued in PCT Application No. PCT/US2018/026154" dated Jul. 12, 2018, 10 Pages.

(Continued)

*Primary Examiner* — Kendall Dolly
(74) *Attorney, Agent, or Firm* — Workman Nydegger

(57) ABSTRACT

A system is provided for detecting creation of malicious user accounts. The system includes a processor, a memory, and an application including instructions configured to: collect data corresponding to creation of new user accounts, where the new user accounts are associated with at least two distinct organizations, at least two distinct subscriptions, or at least two distinct customers, and where each of the new user accounts has a user name; determine properties based on the data and for a group of similar ones of the user names; evaluate the properties of the new user accounts corresponding to the group of similar ones of the user names and determine whether a probability for the new user accounts to be created having the group of similar ones of the user names is less than a predetermined threshold, and generate an alert based on a result of the evaluation of the properties.

21 Claims, 5 Drawing Sheets

(56) References Cited

U.S. PATENT DOCUMENTS

2010/0076922 A1* 3/2010 Hariharan ............... H04L 51/12
706/52
2016/0352860 A1* 12/2016 Deb ....................... G06Q 50/01
2017/0255655 A1* 9/2017 Seal ................. G06F 17/30687

OTHER PUBLICATIONS

Gurajala, et al., "Profile characteristics of fake Twitter accounts", In Journal of Big Data & Society, vol. 3, Issue 2, Jul. 2016, pp. 1-13.

Xiao, et al., "Detecting Clusters of Fake Accounts in Online Social Networks", In Proceedings of the 8th ACM Workshop on Artificial Intelligence and Security, Oct. 16, 2015, 5 pages.

Zafarani, et al., "10 Bits of Surprise: Detecting Malicious Users with Minimum Information", In Proceedings of the 24th ACM International on Conference on Information and Knowledge Management, Oct. 19, 2015, 9 pages.

Freeman, David Mandell, "Using Naive Bayes to Detect Spammy Names in Social Networks", In Proceedings of the ACM workshop on Artificial intelligence and security, Nov. 4, 2013, 10 pages.

* cited by examiner

SYSTEM AND METHOD FOR DETECTING CREATION OF MALICIOUS NEW USER ACCOUNTS BY AN ATTACKER

FIELD

The present disclosure relates to security applications, and more particularly to detecting creation of malicious user accounts.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloud-based networks allow computer processing and storing needs to be moved from on premises networks to hybrid cloud or fully cloud-based networks while satisfying data security access requirements. A cloud-based network may include physical machines (PMs) and virtual machines (VMs). Cloud applications may be implemented via the PMs and/or the VMs. The cloud applications can be accessed from client stations of organizations at remote locations.

SUMMARY

A system is provided for detecting creation of malicious user accounts. The system includes a processor, a memory, and an application stored in the memory and including instructions. The instructions are executable by the processor and are configured to: collect data corresponding to creation of new user accounts, where the new user accounts are associated with at least two distinct organizations, at least two distinct subscriptions, or at least two distinct customers, and where each of the new user accounts has a user name; determine properties based on the data and for a group of similar ones of the user names of the new user accounts; evaluate the properties of the new user accounts corresponding to the group of the similar ones of the user names and determine whether a probability for the new user accounts to be created having the group of the similar ones of the user names is less than a predetermined threshold, and generate an alert based on a result of the evaluation of the properties.

In other features, a system for detecting creation of malicious user accounts is provided. The system includes a processor and a memory. An application is stored in the memory and includes instructions, which are executable by the processor. The instructions are configured to: collect data corresponding to creation of new user accounts, where the new user accounts are associated with at least two distinct organizations or at least two distinct subscriptions, and where each of the new user accounts has a user name; determine if one or more of the user names of the new user accounts are likely not one of multiple predetermined names; and select the user names that are likely not one of the predetermined names. The instructions are further configured to: cluster some of the selected user names into a group based on similarities between the user names in the group of the selected user names; determine properties based on the data; evaluate the properties of the new user accounts corresponding to the group of the selected user names and determine whether a probability for the new user accounts to be created with the group of the selected user names is less than a predetermined threshold; and generate an alert based on a result of the evaluation of the properties.

In other features, a system for detecting creation of malicious user accounts is provided. The system includes a processor and a memory. An application is stored in the memory and including instructions, which are executable by the processor and are configured to: collect data corresponding to creation of new user accounts, where the new user accounts are associated with at least two distinct customers, and where each of the new user accounts has a user name; determine if one or more of the user names of the new user accounts are likely not one of multiple predetermined names; and select the user names that are likely not one of the plurality of predetermined names. The instructions are further configured to: determine distances between the selected user names; cluster some of the selected user names into a group based on the distances; determine properties based on the data; evaluate the properties of the new user accounts corresponding to the group of the selected user names and, based on the evaluation, determine whether the new user accounts corresponding to the group of the selected user names are malicious; and generate an alert if the new user accounts corresponding to the group of the selected user names are malicious.

In other features, a non-transitory tangible computer readable medium storing instructions executable by a processor for determining whether new user accounts are malicious is provided. The instructions are for: collecting data corresponding to creation of the new user accounts, where the new user accounts are associated with at least two distinct organizations, at least two distinct subscriptions, or at least two distinct customers, and where each of the new user accounts has a user name; determining if one or more of the user names of the new user accounts are likely not one of multiple predetermined names; and selecting the user names that are likely not one of the predetermined names. The instructions are further for: clustering some of the selected user names into a group based on similarities between the user names in the group of the selected user names; determining properties based on the data; evaluating the properties of the new user accounts corresponding to the group of the selected user names and, based on the evaluation, determining whether the new user accounts corresponding to the group of the selected user names are malicious; and performing a countermeasure based on a result of the evaluation of the properties.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Numerous organizations are utilizing cloud-based resources and/or exposing on-premises resources to the Internet. As a result, different cyber security techniques are used to defend against attacks. As an example, firewalls are implemented to prevent an attacker from obtaining access to a machine. Firewalls cause users to use strong passwords to obtain access to the machine. Although firewalls can minimize access to a machine, firewalls are ineffective in preventing an attacker from gaining access to the machine when the attacker has created a new account on the machine. The machine may be on-premises, implemented in a cloud-based network, or may be implemented as a domain controller server computer of an organization. As an example, a domain controller server computer may include an active directory (e.g., Microsoft Active Directory®). The organization may be of a service provider or a tenant that has a subscription and rents resources from the service provider. Attackers often gain access to a machine, create a new user account with a new user name and then via the new user account have undetected persistent access to the machine. Persistent use via a new user account is more difficult to detect than access via a malicious computer program, such as via a traditional backdoor virus or a Trojan.

Antivirus software can be used to detect malicious computer programs. However, access via a new user account can often go undetected by antivirus software and/or other traditional security products. This is because the traditional security products consider access via a new user account a legitimate access. After an attacker creates the new user account, the attacker is able to connect freely to the compromised machine without leaving a detectable malicious file on the machine.

A new user account may be detected via, for example a Windows registry, an event log, and/or other methods described below. Distinguishing between a legitimately created user account and a user account created by an attacker is challenging. Creation of a new user account is an administrative action that is typically legitimate. For this reason, it can be difficult to detect and identify a new user account as a maliciously created user account without generating a false positive.

The examples set forth herein include a security application that by default operates as if a machine has been attacked and detects malicious activity on the machine. The security application detects creation of new user accounts based on "community knowledge". Community knowledge refers to collection of data corresponding to creation of new user accounts for different organizations, customers, subscriptions, and services. The security application compares and clusters user names of new user accounts of different organizations, customers, subscriptions, and services and then based on the collected data determines whether the new user accounts are malicious.

Figure 1:
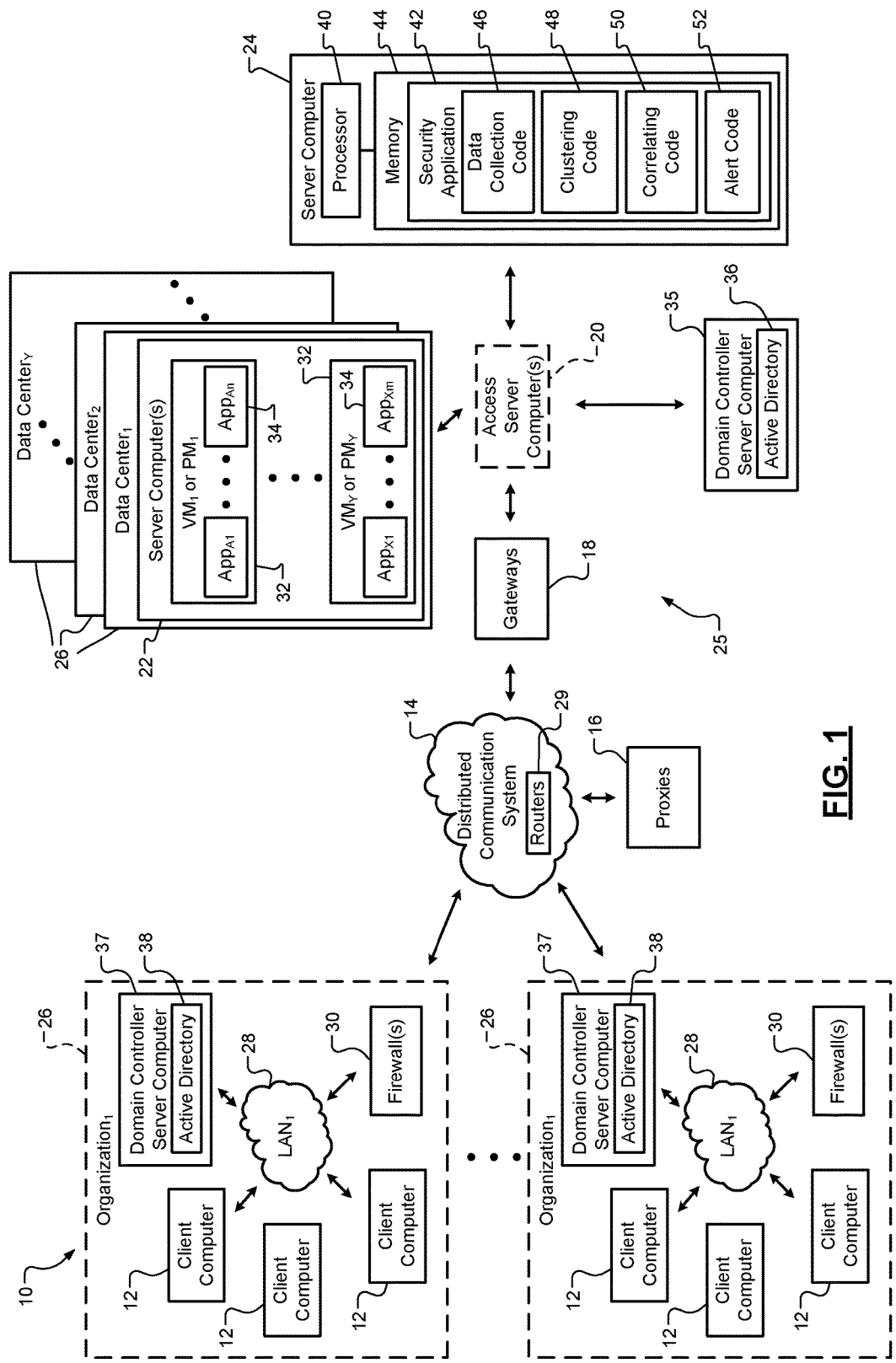
FIG. 1 is a functional block diagram of an example of a portion of a resource allocation system including one or more resource allocation applications in accordance with an embodiment of the present disclosure.
Figure 3:
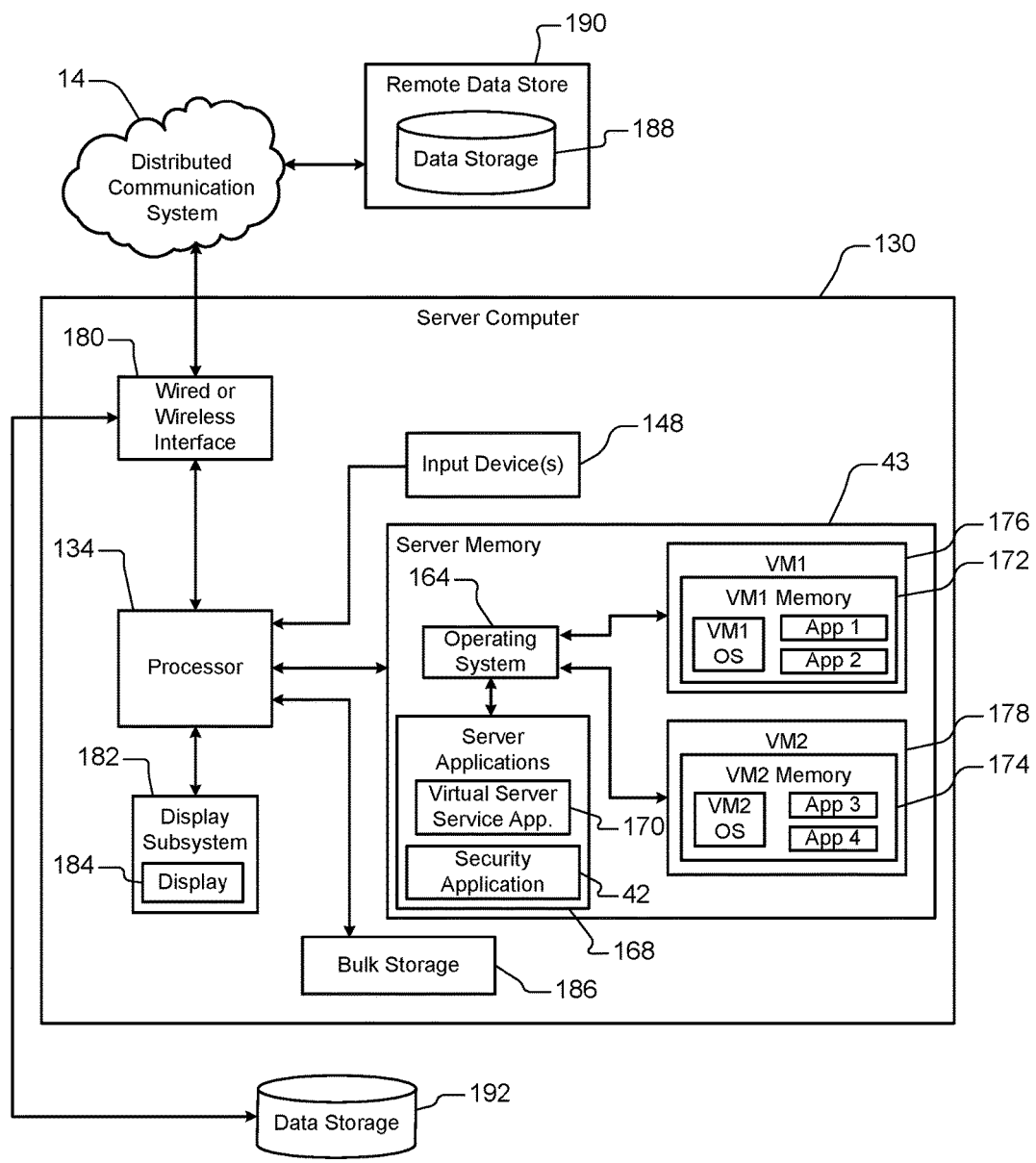
FIG. 3 is a functional block diagram of an example of a server computer incorporating applications in accordance with an embodiment of the present disclosure.

FIG. 1 shows a portion 10 of a security system that includes client computers 12, a distributed communication system 14, proxies 16, gateways 18, one or more access server computers 20, and other server computers 22, 24. In some examples, the gateways 18, one or more access server computers 20, and one or more server computers 22 are implemented in a cloud-based network 25. The server computers 22, 24 may be implemented in data centers; example data centers 26 are shown. Each of the data centers may include data storage and any number of server computers. Example data storage is shown in FIG. 3. The data centers may be located in corresponding geographical regions, where each geographical region refers to: geographical areas of one or more businesses; one or more towns; one or more cities; one or more states; one or more countries; a continent; and/or other geographical area. In some examples, the one or more server computers 24 are implemented in the cloud-based network 25 or in another service provider network. In another example, the access server computers 20 are not included in the security system 10 and the gateways 18 communicate directly with the server computers 22, 24. In the example shown, the client computers are owned by corresponding organizations 27. The organizations 27 may include local area networks (LANs) 28 and firewalls 30. The client computers 12 may access the distributed communication system 14 directly and/or via the LANs 28 and firewalls 30. The distributed communication system 14 may include routers 29. One or more of the organizations 27 may include multiple LANs and corresponding client computers, where each LAN and corresponding client computers are located in a corresponding one of the geographical regions of the data centers 26.

The cloud-based network 25 may be implemented by a cloud service provider and, in an embodiment, includes client virtual machines, network appliances and application server computers. Examples of network appliances include routers, switches, firewalls, proxy server computers, World Wide Web (or Web) server computers, wide area network (WAN) accelerators, intrusion detection system (IDS) devices, and intrusion prevention system (IPS) devices. The network appliances provide intermediary services between the application server computers and client computers. The client computers 12 can be implemented in the cloud-based network 25 as VMs and/or PMs 32 or can be located on premises. The network appliances and application server computers may be implemented as one or more VMs of the cloud-based network 25.

The cloud-based network 25 may include one or more of the server computers 22, 24. The cloud-based network 25 further includes resources that may be shared by the client computers 12. The cloud service provider provisions the resources, such as software applications having corresponding executable code, server computer processing time, server computer processor speed, data storage, VMs, PMs, and/or other resources to tenants (e.g., customers and/or businesses) via the cloud-based network 25. The resource may include user management tools, security application resources, or other resources, such as that provided by Microsoft® Azure®, an example of which being HDInsight®. A tenant may have one or more subscriptions. A subscription may refer to, for example, rental of one or more resources, a container, a set of machines, a logic subset of machines of a business, and/or a business unit. A business unit includes a set of PMs and/or VMs of a tenant. Cloud service providers implement infrastructure as a service (IaaS) and platform as a service (PaaS) using VMs or containers. A container includes processing, storage and application resources. Data centers may include server computers that host the VMs or containers. Each server can host many VMs and/or containers. The VMs run on a guest operating system and interface with a hypervisor, which shares and manages server hardware and isolates the VMs. Unlike VMs, containers do not need a full OS to be installed or a virtual copy of the host server's hardware. Containers may include a few software modules and libraries and require the use of some portions of an operating system. As a result of the reduced footprint, many more containers can be deployed on a server as compared to virtual machines. The server computers 22, 24 may include VMs (e.g., $VMs_{1-Y}$ are shown), which may be implemented as PMs (e.g., $PMs_{1-Y}$). The software applications may be implemented on the server computers 22, 24, which may be referred to as physical machines.

The client computers 12 may be privately owned by different individuals and/or entities. In the example shown, the client computers 12 are owned by organizations 27. Each of the client computers 12 may access one or more cloud applications 34 stored in the server computers 22 and/or VMs 32. The organizations 27 may own and/or have paid access to corresponding ones of the VMs 32 and/or cloud applications 34. The client computers 12 may include desk/laptop computers, tablets, mobile phones, wearable devices, access terminals, and/or other network devices for accessing the cloud applications 34. Accessing of the cloud applications 34 may include: communicating with the cloud applications 34; transferring data, packets, information, etc. between the client computers 12 and the server computers 22 in association with the cloud applications 34; modifying and/or updating the cloud applications; and/or uploading and/or downloading the cloud applications 34 and/or files associated with the cloud applications 34.

The distributed communication system 14 may include routers, switches and/or other network devices for directing data and/or packets between (i) the client computers 12 and/or organizations 27 and (ii) the gateways 18. The distributed communication system 14 may include a network, such as a local area network (LAN), a wireless local area network (WLAN), and/or a wide area network (WAN) (e.g., the Internet). The proxies 16 may transfer data, packets, information, etc. between the firewalls 30 and the gateways 18. In an embodiment, the proxies 16 are implemented as part of the distributed communication system 14. The gateways 18 may transfer data, packets, information, etc. between the distributed communication system 14 and the access server computers 20. The access server computers 20 may provide access to direct communication with the server computers 22 and/or 24. In one embodiment, the access server computers 20 are implemented as client access server computers and facilitate providing services, such as services associated with software as a service (SaaS) applications, from the server computer 24 to the client computers 12. The gateways 18, the access server computers 20, the server computers 22 and/or the server computers 24 may be implemented in an internal network of a service provider that provides software applications.

The security system 10 may further include one or more domain controller server computers. As a first example, a domain controller server computer 35 that implements an active directory 36. The domain controller server computer 35 may handle user authentication and authorization for user accounts, such as web accounts (e.g., a Microsoft® account) or a cloud-based account (e.g., a Windows® account). The web accounts may be used to access websites and may be based on respective email addresses. The Windows Account® may be used to access, for example, Skype®, Outlook.com®, OneDrive®, Windows Phone®, Xbox Live®, files, photos, contacts, cloud settings for account, etc. Although some of the user accounts described herein are referred to as Windows® accounts, the user accounts referred to herein may be for other predetermined operating systems. As another example, domain controller server computers 37 that implement active directories 38 may be implemented as part of the organizations 26 and handle authentication and authorization for user accounts of the organizations 26. The domain controller server computers 35, 37 may determine whether a user account is an administrator account.

Each of the server computers 24 includes a processor 40 that execute software applications, such as a security application 42, which is stored in a memory 44. One or more of the VMs 32 and/or other resources to be allocated to customers may be implemented in the server computers 24. The security application 42 includes data collection code 46, clustering code 48, correlating code 50 and alert code 52. Although the codes 46, 48, 50 and 52 are shown as being part of a single application (the security application 42), the codes 46, 48, 50 and 52 may be implemented as part of two or more applications.

The security application 42 may be provided as a service application by the service provider and provide security application services. The security application 42 is used to monitor new account generation on the client computers 12, server computers 20, 22, 24, domain controller server computers 35, 37, and/or other network devices and/or machines. The security application 42 monitors behavior of the client computers 12 and/or users of the client computers 12 directed to access of the cloud-based resources including access of the applications 34 and VMs/PMs 32.

Execution of the codes 46, 48, 50, 52 may include execution of respective algorithms and/or methods including use of one or more equations to perform clustering and/or correlating operations. The codes 46, 48, 50, 52 may be iteratively executed for consecutive periods of time. The data collection code 46 collects data associated with new user accounts. The clustering code 48 clusters user names of the new user accounts to provide one or more groups of user names based on predetermined criteria. The correlating code 50 determines properties for the groups of user names based on the collected data and correlates the properties. The alert code 52 determines based on the correlation if the generation of the new user accounts for each group of user names is likely to occur. If generation of the new user accounts for a group of user names is likely to occur, then a countermeasure is performed.

Figure 2:
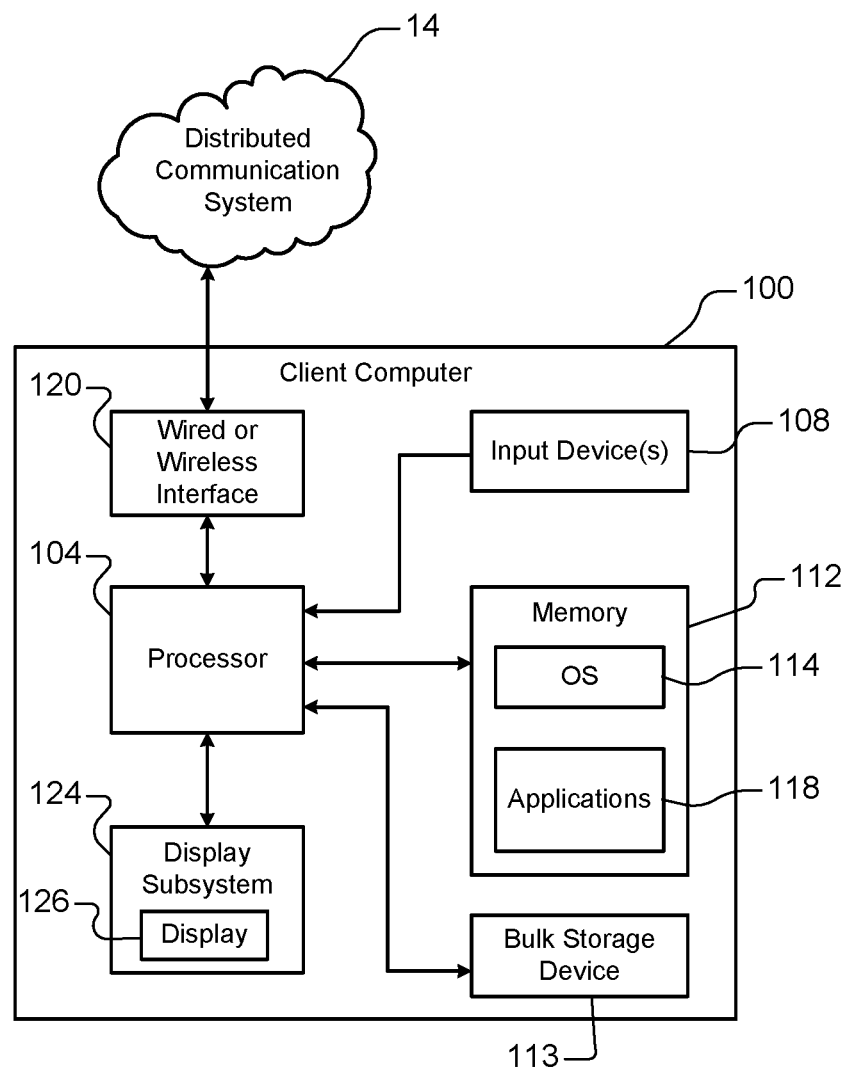
FIG. 2 is a functional block diagram of an example of a client computer in accordance with an embodiment of the present disclosure.

In FIG. 2, a simplified example of a client computer 100 is shown. The client computers 12 of FIG. 1 may be implemented as the client computer 100. The client computer 100 includes a central processing unit (CPU) or processor 104 and an input device 108 such as a keypad, touchpad, mouse, etc. The client computer 100 further includes memory 112 such as volatile or nonvolatile memory, cache or other type of memory. The client computer 100 further includes bulk storage device 113 such as flash memory, a hard disk drive (HDD) or other bulk storage device.

The processor 104 of the client computer 100 executes an operating system 114 and one or more applications 118. For example, the applications 118 may include a browser. The client computer 100 further includes a wired interface (such as an Ethernet interface) and/or wireless interface (such as a Wi-Fi, Bluetooth, near field communication (NFC) or other wireless interface (collectively identified at 120)) that establishes a communication channel over the distributed communication system 14. The client computer 100 further includes a display subsystem 124 including a display 126.

In FIG. 3, an example of a server computer 130 is shown. The server computers 20, 22, 24 of FIG. 1 may be implemented as and/or have similar architecture as the server computer 130. The server computer 130 includes one or more processors and an input device 148 such as a keypad, touchpad, mouse, etc. The server computer 130 further includes a server memory 132, such as volatile or nonvolatile memory, cache or other type of memory, and a processor 134. The processor 134 executes an operating system (OS) 164 and one or more server applications 168 and/or VM applications. Examples of server applications include the security application 42 and a virtual server service application 170, which is implemented in a virtualization layer and is executed along with the OS 164. The server applications 168 include code (e.g., one or more of the codes 46, 48, 50 and 52). The virtual server service application 170 creates a virtual environment in which VM (or guest) OSs (e.g., VM1 OS and VM2 OS) run. Example VM applications App 1, App 2, App 3, and App 4 are shown as being implemented in VM memories 172, 174 of VMs 176, 178, respectively. The VM applications may include instances of auto-generated websites, network appliances, storage applications, productivity applications, and/or other VM applications. VM applications App 1-4 are shown as examples. Each of the VM memories may include one or more VM applications.

The server computer 130 further includes a wired or wireless interface 180 that establishes a communication channel over the distributed communication system 14. The server computer 130 further includes a display subsystem 182 that includes a display 184. The server computer 130 may further include a bulk storage device 186 such as flash memory, a hard disk drive (HDD) or other local or remote storage device. The processor 134 may also access a data storage 188 of a remote data store 190 via the interface 180 and the distributed communication system 14, or a data storage 192, such as a database, via the interface 180. One or more of the operating systems on the client computers of FIGS. 1-2 and the server computers of FIGS. 1 and 3 may be Windows® based operating systems, which allow for detecting creation of new user accounts.

Figure 4A:
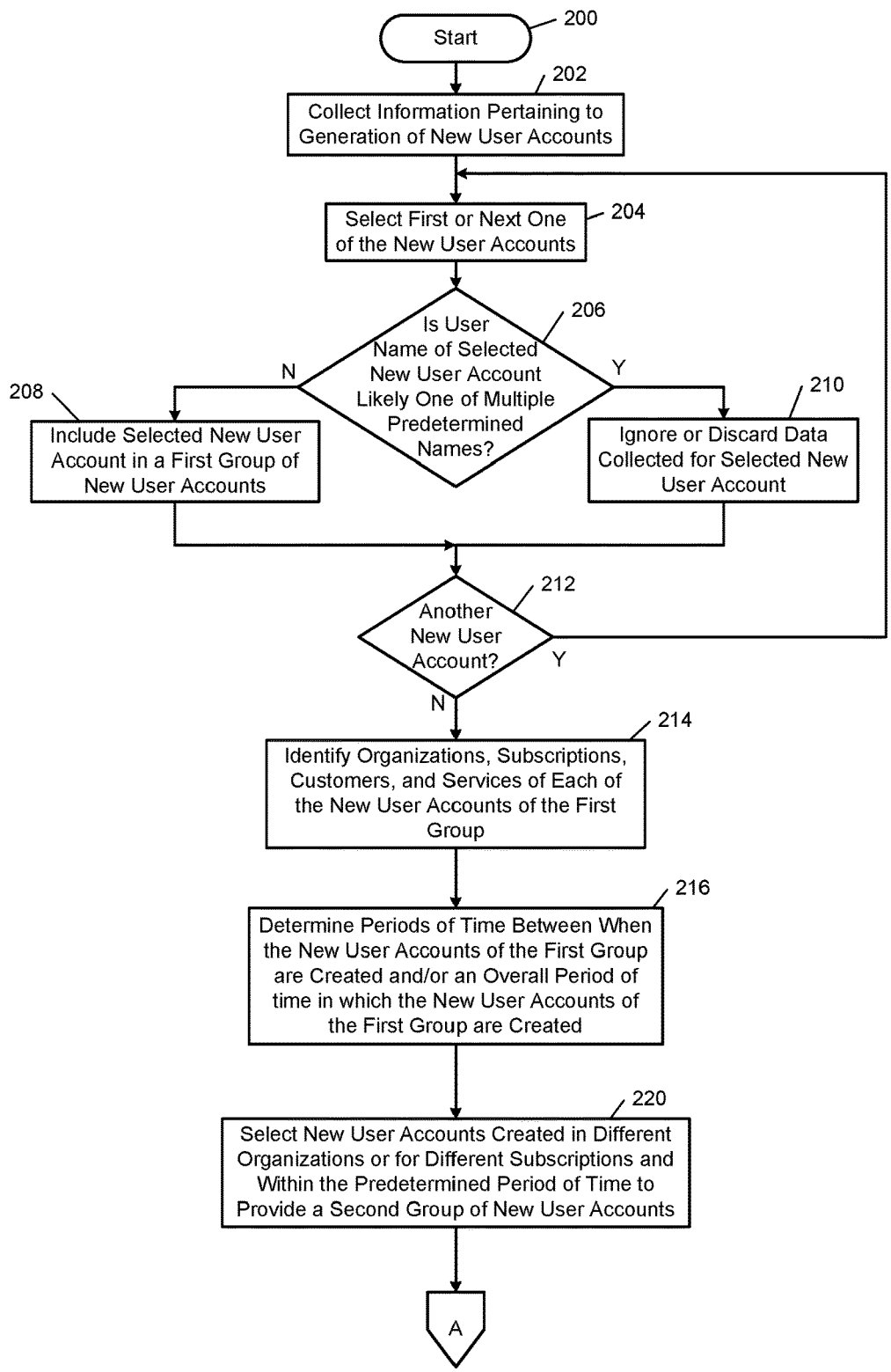
FIGS. 4A and 4B (collectively FIG. 4) illustrate a new account monitoring method in accordance with an embodiment of the present disclosure.
Figure 4B:
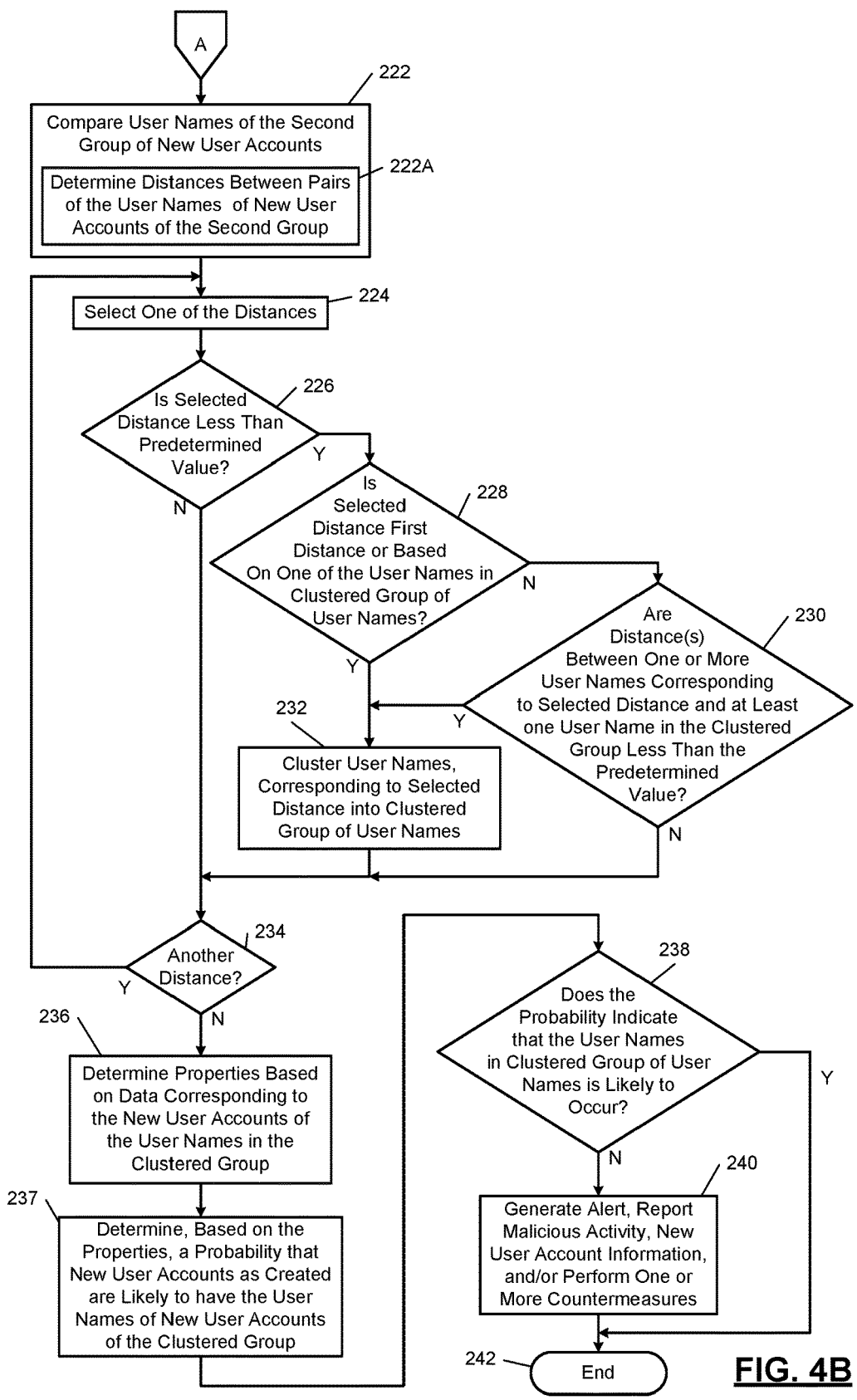

FIG. 4 shows a new account monitoring method. The method begins at 200 and includes execution of the security application 42 by the processor 40. Although the following operations are primarily described with respect to the implementations of FIG. 1, the operations may be modified to apply to other implementations of the present disclosure. The operations may be iteratively performed.

Data Collection

At 202, the security application 42 executes the data collection code to collect data associated with new user accounts. Operation 202 may be periodically, randomly, and/or continuously iterated to monitor generation of new user accounts. The new user accounts may be created in organizations, in cloud-based networks, at service providers, and/or elsewhere. This may include accessing and/or generating and transmitting request signals to computers, machines, data storage, and/or other network devices for data collection. The computers in the organizations and at the service providers and the machines in the cloud-based networks may include agents. The agents may be, for example, software applications that access and provide the requested data. The data may be collected via Windows® registries and/or event logs. New user accounts may be created via Windows® security events. The data collected may depend on the platforms including the hardware, operating systems, software, and/or web browsers used to generate the new user accounts. The data may include: user names; user types; account types; timestamps of when new user accounts are generated; user machine identifier (ID); customer identifier of user creating the account; Internet protocol (IP) address of the customer that created the account; IP address of the computer and/or machine that created the account; etc. As an example, in a Windows® system, data may be collected based on Windows® security event 4720, which indicates that a new user account has been created. The data may be collected from the active directories 36, 38, which log data associated with user account creation.

The data may include other parameters, such as: data transfer rates; data transfer times; requests per second; source and destination Internet protocol (IP) addresses; identifiers (IDs) of geographical regions where requests are generated, received and/or addressed; IDs of ports; IDs of data centers; IDs of server computers; tenant IDs; subscription IDs; and/or other traffic flow and/or loading information. The requests per second may refer to requests of customers, client computers, VMs, PMs, and/or other entities of a tenant.

At 204, a first one (for a first iteration of operation 204) or a next one (for subsequent iterations of operation 204) of the new user accounts is selected. At 206, the processor 40 determines if the user name of the selected new user account is likely one of multiple predetermined names. The predetermined names may include administrator names, guest user names, or other "standard" names. The predetermined names may be associated with non-generic accounts. The predetermined names may be associated with a shared account shared by multiple users. The existing new user accounts are scanned and statistical methods may be used to determine which of the new user accounts have user names that are likely the same or similar to corresponding ones of the predetermined names. In one embodiment, the predetermined names are associated with personal accounts or accounts of individuals of an organization. If the user name of the selected new user account is likely not one of the predetermined names, then operation 208 is performed, otherwise operation 210 is performed.

The data that is collected by iteratively performing operations 204-210 may include data for new user accounts that are associated with at least two distinct organizations, at least two distinct subscriptions, at least to distinct customers, and/or at least two distinct services. Examples of services are cloud-based services, security services, storage allocation services, software application services, email services, business management services, human resource services, information technology (IT) services, billing services, etc. At 208, the selected new user account is included in a first group of new user accounts. At 210, the data associated with the selected new user account may be ignored and/or discarded. At 212, the processor 40 determines whether there is another new user account. If there is another new user account, operation 204 is performed, otherwise operation 214 is performed.

Clustering

At 214, the processor 40 executes the clustering code 48 and identifies the organizations, tenants, subscriptions, customers and services of the new user accounts in the first group based on the collected data. At 216, the processor 40 while executing the clustering code 48 determines periods of time between when the new user accounts of the first group are created and/or an overall period of time in which the new user accounts of the first group are created. At 220, the processor 40 while executing the clustering code 48 selects ones of the new user accounts of the first group created for different organizations, different tenants, different subscriptions, different customers, and/or different services and within the predetermined period of time to provide a second group of the new user accounts.

At 222, the processor 40 while executing the clustering code 48 compares the user names of the new user accounts in the second group to determine which of the user names are the same and/or similar. The processor 40 clusters some of the user names of the new user accounts in the second group based on similarities between the user names. The user names of the new user accounts that are in the second group that are the same or similar are grouped to provide a clustered group. As a first example, the usernames "moshelL", "moshelL", and "moshelL" may be clustered. As a second example, the usernames "exampleName01", "exampleName02", "exampleName03", and "exampleName04" may be clustered. This may occur during operation 222, or as described for the example embodiment of FIG. 4 may occur during operation 232. The clustering may be based on the predetermined criteria, an example of which is described with respect to the following operations 226, 228, 230, 232.

In one embodiment and at 222A, the processor 40 determines distances between pairs of the user names of the new user accounts in the second group. As an example, distances between each of the user names of the new user accounts in the second group and each of the other user names of the new user accounts in the second group are determined. In one embodiment, each of the determined distances is a Levenshtein distance. Levenshtein distances are disclosed as one example, other types of distances may be determined.

The following operations 224, 226, 228, 230, 232 are provided as an example for determining whether to cluster certain user names. Operations 224, 226, 228, 230, 232 may not be performed and/or may be modified depending on the application. At 224, the processor 40 selects a first one of the distances. At 226, the processor 40 determines whether the selected distance is less than a predetermined value. If the selected distance is less than the predetermined value, then operation 228 is performed, otherwise operation 234 is performed.

At 228, the processor 40 determines if the selected distance is a first distance selected for a first iteration of operation 224 or whether the selected distance is based on one of the user names in the clustered group of user names. A distance is based on a user name if the distance is determined between the user name and another user name. If the selected distance is a first distance or is based on one of the user names in the clustered group, then operation 232 is performed, otherwise operation 230 is performed. Note that if the selected distance is a first distance, then there is no user name in the clustered group since the clustered group has not yet been created. Inclusion of user names in a clustered group occurs at 232.

If operation 230 is performed, then the selected distance is not a first distance and is not based on a user name in the clustered group of user names. In other words, the selected distance is based on two user names that are not in the selected group of user names. At 230, the processor 40 determines whether one or more distances between the user names of the selected distance and at least one user name in the clustered group of user names are less than the predetermined value. If this is TRUE, then operation 232 is performed, otherwise operation 234 is performed. If operation 230 is FALSE, then the user names associated with the selected distance are not similar to the user names in a clustered group.

If operation 230 is FALSE, another clustered group may be created by performing operations 224, 226, 228, 230, 232, 234 for another clustered group of user names. For example, after the same or similar user names from the second group have been clustered for a first clustered group, operations 224, 226, 228, 230, 232, 234 may be iteratively performed again for user names that are not the same or similar to the user names of the first clustered group. Any number of clustered groups may be created. When the operations 224, 226, 228, 230, 232, 234 are iteratively performed again to generate another clustered group, the distances associated with previously generated clustered groups may not be selected at 224.

At 232 and in one embodiment, the new user accounts with the same or similar user names that were created in the predetermined period of time (e.g., a predetermined number of hours or days) are clustered based on the determined distances. At 234, the processor 40 determines if there is another distance to be selected. If there is another distance to be selected, then operation 224 is performed, otherwise operation 236 may be performed. Operations 224, 226, 228, 230, 232, 234 are provided as an example, the user names that are the same or similar may be clustered using other operations, algorithms, and/or methods.

Correlation

The following operations 236, 237, 238, 240 may be iteratively performed for each clustered group. At 236, the processor 40 executes the correlating code 50 to determine properties based on the collected data for the new user accounts in the clustered group. The properties may include the data and/or information derived based on the data. One or more of the properties may represent the clustered group. As an example, the properties may include user types, IP addresses of the computer or machine that created the new use account, a size of the clustered group (e.g., number of user names in the clustered group), time passed between creation of the new user accounts in the clustered group, uniqueness of the user names in the clustered group, and/or other properties. The uniqueness of a user name in the clustered group may be a value indicating a likelihood level that the user name of any user account is the user name of the clustered group.

At 237, the processor 40 evaluates and/or compares the properties to determine a probability (or chance) that new user accounts as created for the clustered group are likely to have the user names of the new user accounts of the clustered group. This may include comparing properties of the same type to determine how remote or unrelated the new user accounts are relative to each other. Comparing properties of the same type may indicate whether the new user accounts are for different organizations, tenants, subscriptions, customers, services, geographical regions or otherwise unrelated. The probability may be calculated based on previously stored statistical and/or historical data of user names. In one embodiment, the probability is simple a HIGH or LOW indicator indicating whether the user names are likely or not to have been created.

The evaluation of the properties may include comparing types of users, types of accounts, and/or IP addresses of the new user accounts corresponding to the clustered group to determine if there are matches. The probability may be increased if there are matches. The evaluation may include determining if a number of user names in the clustered group are greater than a predetermined value. The probability may be adjusted based on the number of user names. In one embodiment, if the number of user names is greater than a predetermined value, then the probability is increased.

At 238, the processor 40 determines whether the probability indicates that the user names of the clustered group are likely to occur. This may include indicating, for the corresponding organizations, tenants, subscriptions, customers, services, geographical regions where the new user accounts were created, and the periods of time in which the new user accounts were created, whether the new user accounts of the clustered group are likely to have the corresponding user names.

An attacker typically repeats the same malicious activities on multiple machines. Thus, new user accounts created by an attacker often have a same or similar user name. The above-described operations compare the user names of the new user accounts as an indicator of malicious activity. Generation of new user accounts with the same or similar user name for different customers, organizations, services and/or subscriptions does not typically occur. As an example, a new user name of "micprodA" may be created on a first virtual machine of a first organization. After a few hours, another user account with the same user name may be created on a second virtual machine of a second organization. After a couple more hours, another user account with the same user name may be created on a third virtual machine of a third organization. A probability that three new user accounts with the same user name (e.g., a non-standard non-administrative user name) are created in three different organizations is low.

If the probability determined at 238 is low or less than a predetermined value, then operation 240 may be performed, otherwise the method may end at 242. This is an indicator of whether the new user accounts are malicious user accounts. If the probability is low, then a probability that the new user accounts are malicious if high.

Alert

At 240, the processor 40 executes the alert code to generate an alert to notify, for example, a customer, a client, a service provider, a system administrator of organization, one or more machines, etc. of high probability that new user accounts are malicious. The alert may indicate the data, the properties, and/or other information pertaining to the new user accounts of the clustered group and/or information pertaining to the fraudulent activity. The processor 40 may perform other countermeasures to prevent further activity using the new user accounts of the clustered group. In one embodiment, the processor 40 generates the alert as one or more emails, which are sent to the customer, client, service provider, system administrator, etc. In another embodiment, the alert is provided via a security tool and/or security website accessible to the customer, client, service provider, system administrator, etc.

As a first countermeasure, first alerts are generated to indicate anomalies associated with the malicious new user accounts. As a second countermeasure, statistics associated with the malicious new user accounts are reported, which may include reporting user/customer IDs, client computer IDs and/or addresses, cloud application IDs, VM IDs and/or IP addresses, PM IDs and/or IP addresses, an industry ID, an ID of a geographical area of origin of attacking entity, IDs of geographical areas of origin of entities being attacked, types and/or IDs of corresponding cloud applications, an organization ID, and/or other parameters disclosed herein and related statistic information. The reported information may be provided to corresponding users, client computers, owners and/or representatives of an organization, owners of VMs and/or PMs of cloud applications, and/or representatives of a service provider of the security application 42 and/or the cloud applications. Information provided in the reported alerts and/or statistics may be stored in the memory 44 and later accessed.

As another countermeasure, the security application 42 may alert a user, prevent the user from accessing one or more cloud applications from any of the client computers 12, and/or limit access of the user to the one or more cloud applications. As another countermeasure, the security application 42 may alert a client computer, prevent the client computer from accessing one or more cloud applications, and/or limit access of the client computer to the one or more cloud applications. As yet another example, the user and/or the client computer may be limited to operating the one or more cloud applications is a safe operating mode with limited functions. As another countermeasure, a VM and/or PM performing an attack may be limited in operations available to be performed and/or access to the VM and/or PM may be limited and/or presented. As another countermeasure, the security application 42 may provide owners of VMs and/or PMs with an alert and the statistic information. As another countermeasure, the security application 42 may provide a representative and/or owner of an organization and/or a service provider with an alert and the statistic information. In one embodiment, security alerts are generated for the riskiest anomaly groups.

In another embodiment, prior to or after establishing that the new user accounts are malicious user accounts, information pertaining to the new user accounts may be shared among client computers, customers, machines, server computers, service providers, organizations, etc. For example, if a first machine becomes aware that a new user account is malicious, the first machine may share this information with other machines in the same or different organizations and/or with service providers. Service providers may also share this information with client computers and/or machines in cloud-based networks. This allows the machines to proactively prevent further attacks using the same or similar user name of the malicious new user account. The machines may block actions and/or delete data provided from a source of the malicious new user account. A shared indication may be provided prior to operation 237, in which case, the probability that the new user account is malicious may be increased.

The above-described operations of FIG. 4 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events. In an embodiment, the security application 42 includes a privacy management feature that allows a user to enable and disable performance of the method of FIG. 4.

Security products exist that are based on behavioral detection, as compared to products that are based on signatures. However, the products that are based on behavioral detection are not able to distinguish between a malicious new user account and a legitimate administrative operation. The above-described method is based on community knowledge including monitoring creation of new user accounts in different machines in a cloud-based network and as a result being able to detect anomalies. The above-described method detects compromised machines by detecting emerging new user accounts and corresponding user names. The method detects malicious new user accounts while minimizing false positives. The method identifies the malicious new user accounts without (i) first building a model over time of historical data to classify a certain behavior and/or set of data as malicious, and then (ii) determining if a new user account is malicious. The disclosed method is able to quickly determine, shortly after new user accounts are created and without previously stored historical data and/or generated model of historical data, whether the new user accounts are malicious. This is accomplished by determining (i) whether the new user accounts are for different organizations, subscriptions, customers, and/or services, (ii) whether the new user accounts are created within a predetermined period of each other, and (iii) whether the user names of the new user accounts are the same or similar.

As another real world example, in July, the method may detect a unique user name (UserName1) on two computers associated with a same subscription. The corresponding new user accounts may have been created during a same period of time. In addition and during the same period of time (an hour), the same unique user name may have been used for a new user account added on a third machine and for a different subscription of a different customer in a different geographical region than the first two new user accounts. The above-described method may be performed to determine that the new user accounts are malicious.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element; such as by encode instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for detecting creation of malicious user accounts and for modifying computing access of those malicious user accounts, the system comprising:
one or more processors; and
one or more computer-readable hardware storage devices having stored thereon computer-executable instructions which, when executed by the one or more processors, cause the system to:
collect data corresponding to a plurality of user accounts, wherein the collected data at least describes a corresponding username for each user account included in the plurality of user accounts, and wherein the collected data is collected based on a security event in which log data associated with each user account in the plurality of user accounts is logged in one or more active directories;
generate a cluster of related user accounts by identifying a set of related usernames, wherein:
each related username in the set of related usernames is selected from the usernames described by the collected data, and
the related usernames in the set are selected as a result of said related usernames sharing one or more username similarities with one another;
based both on the set of related usernames and on one or more other corresponding characteristics of each related user account in the cluster of related user accounts, determine that the related user accounts in the cluster of related user accounts are malicious accounts; and
selectively modify computing access of any one or more of the malicious accounts.

2. The system of claim 1, wherein execution of the computer-executable instructions further causes the system to:
determine if one or more of the usernames described by the collected data correspond to a plurality of predetermined names, wherein the plurality of predetermined names includes administrator usernames, guest usernames, or a standard username.

3. The system of claim 2, wherein:
the collected data includes timestamps of creation of the user accounts in the plurality of user accounts, and
the cluster of related user accounts is generated based on differences in the timestamps.

4. The system of claim 2, wherein the plurality of predetermined names includes user names having a security level higher than or equal to a predetermined security level.

5. The system of claim 2, wherein the collected data further includes data describing computing ports associated with the plurality of user accounts.

6. The system of claim 2, wherein execution of the computer-executable instructions further causes the system to:
compare the usernames described by the collected data by determining distances between pairs of the usernames, wherein the related usernames in the set of related usernames are selected based on corresponding distances of said related usernames.

7. The system of claim 6, wherein particular usernames are selected for inclusion in the set of related usernames based on whether corresponding distances of said particular usernames are less than a predetermined value.

8. The system of claim 7, wherein the distances are Levenshtein distances.

9. The system of claim 1, wherein the plurality of user accounts includes a user account of a predetermined operating system, a service provider user account, or a domain controller user account.

10. The system of claim 1, wherein the collected data includes:
user types or account types of the plurality of user accounts;
identifiers of account domains of the plurality of user accounts; and
security identifiers of the plurality of user accounts.

11. The system of claim 1, wherein the collected data includes:
identifiers or Internet protocol addresses of machines on which the plurality of user accounts were created; and
one or more identifiers or Internet protocol addresses of one or more machines causing creation of the plurality of user accounts.

12. The system of claim 1, wherein execution of the computer-executable instructions further causes the system to:
generate and send an alert to inform one or more other computing systems regarding the malicious accounts.

13. The system of claim 1, wherein selectively modifying computing access of the any one or more of the malicious accounts includes preventing further activity of the any one or more of the malicious accounts.

14. The system of claim 1, wherein selectively modifying computing access of the any one or more of the malicious accounts includes limiting the computing access to only a safe operating mode having limited computing functions.

15. The system of claim 1, wherein execution of the computer-executable instructions further causes the system to:
determine a size of the set of related usernames; and
generate an alert if the size is greater than a predetermined size.

16. The system of claim 1, wherein execution of the computer-executable instructions further causes the system to:
determine a uniqueness of the related usernames in the set of related usernames; and
generate an alert based on the uniqueness.

17. A method for detecting creation of malicious user accounts and for modifying computing access of those malicious user accounts, the method being performed by a computing system and comprising:
collecting data corresponding to a plurality of user accounts, wherein the collected data at least describes a corresponding username for each user account included in the plurality of user accounts, and wherein the collected data is collected based on a security event in which log data associated with each user account in the plurality of user accounts is logged in one or more active directories;
generating a cluster of related user accounts by identifying a set of related usernames, wherein:
each related username in the set of related usernames is selected from the usernames described by the collected data, and
the related usernames in the set are selected as a result of said related usernames sharing one or more username similarities with one another;
based both on the set of related usernames and on one or more other corresponding characteristics of each related user account in the cluster of related user accounts, determining that the related user accounts in the cluster of related user accounts are malicious accounts; and
selectively modifying computing access of any one or more of the malicious accounts.

18. The method of claim 17, wherein the method further includes:
determining a probability that the related user accounts in the cluster of related user accounts are malicious accounts.

19. The method of claim 17, wherein the cluster of related user accounts is generated based on one or more timestamps associated with each related user account in the cluster of related user accounts.

20. One or more hardware storage devices having stored thereon computer-executable instructions that, when executed by one or more processors of a computer system, cause the computer system to detect creation of malicious user accounts and to modify computing access of those malicious user accounts by causing the computer system to:
collect data corresponding to a plurality of user accounts, wherein the collected data at least describes a corresponding username for each user account included in the plurality of user accounts, and wherein the collected data is collected based on a security event in which log data associated with each user account in the plurality of user accounts is logged in one or more active directories;
generate a cluster of related user accounts by identifying a set of related usernames, wherein:
each related username in the set of related usernames is selected from the usernames described by the collected data, and
the related usernames in the set are selected as a result of said related usernames sharing one or more username similarities with one another;
based both on the set of related usernames and on one or more other corresponding characteristics of each related user account in the cluster of related user accounts, determine that the related user accounts in the cluster of related user accounts are malicious accounts; and
selectively modify computing access of any one or more of the malicious accounts.

21. The one or more hardware storage devices of claim 20, wherein execution of the computer-executable instructions further causes the computer system to:
determine a probability that the related user accounts in the cluster of related user accounts are malicious accounts.

* * * * *